United States Patent Office 3,669,775

Patented June 13, 1972

3,669,775

REMOVAL OF BORON AND PHOSPHOROUS-CONTAINING GLASSES FROM SILICON SURFACES

Roy A. Porter, Whitehall, Pa., assignor to Bell Telephone Laboratories, Incorporated, Murray Hill and Berkeley Heights, N.J.

No Drawing. Filed Dec. 29, 1969, Ser. No. 888,827

Int. Cl. H01l 7/50

U.S. Cl. 156—17 10 Claims

ABSTRACT OF THE DISCLOSURE

Boron and phosphorous-doped glasses which are formed on silicon surfaces during electronic device manufacture may be chemically removed by a method including the steps of treatment with a solution of a suitable chelating agent having a pH of at least 9.0 at room temperature and a temperature of at least 85° C., followed by treatment with an oxidizing agent, followed by repeated treatment with the chelating agent solution.

BACKGROUND OF THE INVENTION

Field of the invention

This invention relates to a method for chemically removing boron and phosphorous-containing silica glass from silicon surfaces, and is useful in the manufacture of diffused junction semiconductor devices.

Prior art

In the manufacture of silicon devices such as integrated circuits, n-type and p-type regions are often formed by (1) depositing impurity doped glass on the silicon surface and diffusing impurity through the glass into the silicon, (2) removing the glass, and (3) "spreading" the impurity to the desired depth in the silicon. This method of manufacture is described in U.S. Pat 3,066,052 issued to B. T. Howard on Nov. 27, 1962. The glass removal step has in the past been achieved by treating the glass alternatively with hydrofluoric and nitric acid solutions or with hydrofluoric acid solution and steam. Although it would be desirable to replace the corrosive hydrofluoric acid with a relatively innocuous material, a continued effort to find a suitable substitute has not been successful.

SUMMARY OF THE INVENTION

It has been found that boron and phosphorous-doped glasses which are formed on silicon surfaces during integrated circuit manufacture may be chemically removed by a method including one or more treatments with an aqueous solution of a chelating agent such at EDTA, having a pH of at least 9.0 at room temperature and a temperature of at least 85° C., and treatment with an oxidizing agent prior to the final treatment with the chelating agent solution. This method results in uniform and substantially complete glass removal to a residual thickness typically below 20 A., and without the attack of the underlying silicon surface, thus permitting the substitution of such a chelating agent solution for hydrofluoric acid solution in the glass removal step of integrated circuit manufacture.

A preferred treatment cycle includes treatment first with the chelating agent solution, then with the oxidizing agent and finally again with the chelating agent solution Boron-rich glasses and gold-containing or other heavy metal atom-containing glasses may require repetition of the cycle for substantially complete glass removal.

Additional advantages to the use of such chelating agents include their tendency to adsorb ions which are generally thought to be undesirable impurities in integrated circuit manufacture, and their inability to attack commonly employed masking layers such as steam-grown silicon dioxide and silicon nitride.

DETAILED DESCRIPTION OF THE INVENTION

The invention process has been found to be effective in removing boron and phosphorous-containing glasses from silicon surfaces when such glasses have been formed by the conventional methods practiced in the semiconductor art. Typically, boron glasses which may be removed are formed by heating a boron source such as $BBr_3$, BN, or $B_2H_6$ in the presence of an oxidizing atmosphere or $B_2O_3$, together with the silicon to be doped at a temperature of about 700° to 1100° C. Phosphorous glasses which may be removed are typically formed by heating a source of $PBr_3$ or $PH_3$ in the presence of an oxidizing atmosphere or $P_2O_5$, together with the silicon to be doped at a temperature of about 900° to 1300° C.

The chelating agents which are suitable for the practice of the invention include: the synthetic amino acids such as ethylene diamine tetraacetic acid (EDTA); the hydroxy acids such as citric acid and glycolic acid; the dicarboxylic acids such as malonic acid and oxalic acid; and aspartic acid.

Although the mechanism is not completely understood, it is essential for substantially complete glass removal to employ an oxidizing agent to treat the glass prior to the final treatment with an aqueous solution of one of these chelating agents. It has been found most convenient in practice to effect glass removal by initially treating the glass with the chelating agent solution in order to effect partial glass removal, and then to treat the remaining glass with the oxidizing agent, and finally to again treat the glass with the chelating agent solution.

For the achievement of commercially acceptable glass removal rates, the chelating agent selected should be present in the solution in an amount of from 0.05 molar to saturation and the solution should be at a temperature of at least 85° C. and have a pH of at least 9.0 at room temperature. For optimum glass removal rates, the concentration of chelating agent should be at least 0.1 molar. Further significant increases in the glass removal rate are generally not attainable for chelating agent concentrations above .5 molar. It is preferred for optimum glass removal rates to adjust the pH of the solution to at least 9.5 at room temperature, and the solution treatment temperature to at least 90° C.

Treatment of the glass with the oxidizing agent is preferably carried out under such conditions as to result in vigorous oxidization of the remaining glass. For example it has been found convenient to treat the glass with a solution of nitric acid or sulphuric acid at a concentration of from 50 percent to saturation and at a temperature of at least 85° C. for several minutes, typically 2 to 20 minutes.

Alternatively, the oxidizing agent could be steam at a temperature of about 700° C. to 1100° C., or other strong oxidizing agent.

Although not critical for glass removal, it may be found advantageous to rinse the glass, preferably with purified water, after each chemical treatment step in order to minimize contamination of the different solutions by one another. The use of deionized water for the final rinse tends to insure the removal of contaminants from the silicon surface which may be detrimental to the operation of an electronic device subsequently fabricated from the silicon.

The glass removal process may include more than one complete cycle, that is, the sequence of steps described above may be required to be repeated in order to achieve substantially complete glass removal in some cases. For example, in the case of glasses containing a large excess of boron or containing small amounts of gold, often added to improve certain device operating characteristics, two cycles are in general required for substantially complete glass removal.

Although the removal process is selective, that is, the rate of attack of the glass is much larger than that of the silicon, it may be preferred in some cases to contact the silicon surface which is not covered by the glass layer with a protective layer of some substance, preferably a substance which is not appreciably attacked itself. Typically, in integrated circuit manufacture, the silicon surface which is not contacted by the glass dopant layer is contacted with a masking layer such as steam-grown silicon dioxide, silicon nitride, or aluminum oxide in order to prevent diffusion of the boron or phosphorous dopant materials from the atmosphere into the regions below the masked portions. These masking layers are substantially completely impervious to attack by the glass removal treatment. It has been observed that the silicon surface below the glass layer is not attacked regardless of the extent or severity of the glass removal treatment.

EXAMPLE I

A 1650 A. thickness of boron-rich glass was formed on a silicon surface by heating a boron source of $BBr_3$ above the silicon in the presence of oxygen at 870° C. The glass layer was then contacted with a 0.1 molar solution of ethylene diamine tetraacetic acid (EDTA) at 95° C. for about five minutes, the pH of which had previously been adjusted to about 9 at room temperature by the addition of ammonium hydrovide. As determined with an ellipsometer, about 700 to 1000 A. of glass was removed. The glass was next rinsed in flowing deionized water for about three minutes and then contacted with concentrated nitric acid at about 95° C. for about five minutes. The glass was again rinsed in flowing deionized water for about three minutes. A final treatment with the solution of EDTA resulted in glass removal to the extent that a residual film of 20 A. thickness remained.

EXAMPLE II

The procedure of Example I was followed except that the temperature of the treating solutions was about 90° C., the pH of the chelating agent solution was adjusted to 9.5 at room temperature and the chelating agent used was malonic acid. Starting with a glass thickness of about 1200 A., the initial treatment with malonic acid solution resulted in removal of about 650 A. of glass. The second treatment with malonic acid solution resulted in a residual glass layer about 15 A. thick. Additional chelating agents which were substituted for malonic acid, and the results of the glass removal treatment using them, are shown in Table 1.

TABLE 1

| Chelating agent | Glass thickness removed, 1st treatment, A. | Remaining after 2nd treatment, A. |
|---|---|---|
| Oxalic acid | 500 | 17 |
| Aspartic acid | 20 | 12 |
| Citric acid | 700 | 15 |
| Glycolic acid | 650 | 16 |
| Ethylacetoacetate | 800 | 20 |

These results indicate that sufficient glass has been removed from silicon surfaces by the inventive process to make such surfaces suitable for use in the manufacture of electronic devices.

I claim:

1. A method for removing silica glass selected from the group consisting of boron-containing and phosphorous-containing silica glass from silicon surfaces comprising: contacting the glass one or more times with an aqueous solution consisting essentially of from 0.05 molar to saturation of a chelating agent selected from the group consisting of ethylene diamine tetraacetic acid, malonic acid, oxalic acid, aspartic acid, citric acid, glycolic acid, and ethylacetoacetate, said solution having a pH of at least 9.0 at room temperature and a temperature of at least 85° C. during contact with the glass; contacting the glass with an oxidizing agent at least one time and prior to contacting the glass with the solution for the final time, and rinsing the glass with water after each contact with solution and oxidizing agent.

2. The method of claim 1 in which the glass is contacted with the solution, followed by contact with the oxidizing agent followed by repeated contact with the solution.

3. The method of claim 1 in which said chelating agent is ethylene diamine tetraacetic acid.

4. The method of claim 1 in which the aqueous solution contains from 0.1 to 0.5 molar of the chelating agent, has a pH of at least 9.5 at room temperature, and contacts the glass at a temperature of at least 90° C.

5. The method of claim 1 in which said oxidizing agent consists of an aqueous solution of an oxidizing acid selected from the group consisting of nitric acid and sulfuric acid.

6. The method of claim 5 in which the aqueous solution contacts the glass at a temperature of at least 90° C.

7. The method of claim 1 in which the oxidizing agent is steam at a temperature of from 700 to 1100° C.

8. The method of claim 1 in which at least a portion of the silicon surface which is not covered by the glass is protected by a masking layer.

9. The method of claim 8 in which the masking layer is selected from the group consisting of silicon nitride and steam-grown silicon dioxide.

10. A method for removing silica glass selected from the group consisting of boron-containing and phosphorous-containing silica glass from silicon surfaces comprising: contacting the glass one or more times with an aqueous solution consisting essentially of from 0.05 molar to saturation of a chelating agent selected from the group consisting of ethylene diamine tetraacetic acid and oxalic acid, said solution having a pH of at least 9.0 at room temperature and a temperature of at least 85° C. during contact with the glass; contacting the glass with an oxidizing agent at least one time and prior to contacting the glass with the solution for the final time, and rising the glass with water after each contact with solution and oxidizing agent.

References Cited

UNITED STATES PATENTS 2,739,882 3/1956 Ellis ................ 156—17
3,437,533 4/1969 Dingwall ............ 148—187

OTHER REFERENCES

Technical Bulletin No. 2, The Versenes, Bevsworth Chem. Co., Framingham, Mass., ©, 1950, Sec. 1, pp. 4–8.

JACOB H. STEINBERG, Primary Examiner

U.S. Cl. X.R.

252—79.4